US007597475B1

(12) United States Patent
Shu et al.

(10) Patent No.: US 7,597,475 B1
(45) Date of Patent: Oct. 6, 2009

(54) MULTIDIMENSIONAL ALIGNMENT APPARATUS FOR HARD X-RAY FOCUSING WITH TWO MULTILAYER LAUE LENSES

(75) Inventors: Deming Shu, Darien, IL (US); Hanfei Yan, Moriches, NY (US); Jorg M. Maser, Oak Park, IL (US)

(73) Assignee: UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 12/233,137

(22) Filed: Sep. 18, 2008

(51) Int. Cl.
*A61B 6/08* (2006.01)
*G02B 7/10* (2006.01)
*G02B 7/04* (2006.01)
*G02B 7/02* (2006.01)

(52) U.S. Cl. ............... 378/205; 378/204; 359/823; 359/824

(58) Field of Classification Search ........... 378/204, 378/205; 359/196.1–226.3, 362, 379, 381, 359/391–394, 565, 621, 622, 754, 793, 809, 359/811, 822–824
See application file for complete search history.

(56) References Cited

U.S. PATENT DOCUMENTS

| | | | |
|---|---|---|---|
| 3,935,486 A * | 1/1976 | Nagashima | 310/12.06 |
| 6,607,840 B2 | 8/2003 | Shu et al. | |
| 6,984,335 B2 | 1/2006 | Shu et al. | |
| 7,359,130 B1 * | 4/2008 | Calvet | 359/819 |
| 7,369,334 B2 * | 5/2008 | Case et al. | 359/822 |
| 2003/0173833 A1 * | 9/2003 | Hazelton et al. | 310/12 |
| 2007/0071164 A1 * | 3/2007 | Shu et al. | 378/43 |

OTHER PUBLICATIONS

U.S. Appl. No. 11/634,681, filed Dec. 6, 2006 by Chian Q. Liu, and entitled "Method of Making and Structure of Multilayer Laue Lens for Focusing Hard X-Ray".

* cited by examiner

*Primary Examiner*—Irakli Kiknadze
*Assistant Examiner*—Anastasia Midkiff
(74) *Attorney, Agent, or Firm*—Joan Pennington

(57) ABSTRACT

A multidimensional alignment apparatus is provided for multidimensional aligning of two linear multilayer Laue lenses (MLLs) for two-dimensional hard X-ray focusing. The multidimensional alignment apparatus precisely aligns and ensures stability of two linear MLLs performing hard x-ray focusing. The multidimensional alignment apparatus includes a base, a lower stages group controlling a first upstream MLL, an upper stages group positioned over the lower stages group controlling a second downstream MLL and an upper stage support attached to the base. The lower stages group provides five degrees of freedom precision positioning adjustment for the first upstream MLL. The second downstream MLL is mounted on the upper stages group with three degrees of freedom adjustment capability.

20 Claims, 3 Drawing Sheets

MULTIDIMENSIONAL ALIGNMENT APPARATUS FOR HARD X-RAY FOCUSING WITH TWO MULTILAYER LAUE LENSES

CONTRACTUAL ORIGIN OF THE INVENTION

The United States Government has rights in this invention pursuant to Contract No. W-31-109-ENG-38 between the United States Government and The University of Chicago and/or pursuant to Contract No. DE-AC02-06CH11357 between the United States Government and UChicago Argonne, LLC representing Argonne National Laboratory.

FIELD OF THE INVENTION

The present invention relates to a multidimensional alignment apparatus for alignment of multilayer Laue lenses, and more particularly this invention relates to a multidimensional alignment apparatus for x-ray focusing with two multilayer Laue lenses.

DESCRIPTION OF THE RELATED ART

Hard x-rays, those with wavelengths shorter than 1 nm, are notoriously hard to focus. Traditional lenses fail to bend this radiation because their index of refraction is very close to 1 in this part of the spectrum and even smooth surfaces reflect the rays only at an extremely glancing angle.

Researchers at Argonne designed a non-traditional type of lens that uses diffraction to focus the high-energy beams into a tiny region. The device was called a multilayer Laue lens because it diffracts X-rays in transmission rather than reflection. The original lens was made out of 728 layers of silicon and tungsten silicide ($WSi_2$) sputtered onto a silicon wafer substrate.

U.S. patent application Ser. No. 11/634,681 filed Dec. 6, 2006 by Chian Q. Liu, Raymond P. Conley, Albert T. Macrander, Hyon Chol Kang, G. Brian Stephenson, and Jorg Maser discloses a zone plate multilayer structure or multilayer Laue lens that includes a substrate carrying a plurality of alternating layers respectively formed of tungsten silicide ($WSi_2$) and silicon (Si). The alternating layers are sequentially deposited precisely controlling a thickness of each layer from a minimum thickness of a first deposited layer adjacent the substrate to a maximum thickness of a last deposited layer. The first minimum thickness layer has a selected thickness of less than or equal to 5 nm with the thickness of the alternating layers monotonically increasing to provide a zone plate multilayer structure having a thickness of greater than 12 μm (microns). The x-rays are diffracted in Laue transmission geometry by the specific arrangement of silicon and tungsten silicide.

A current problem exists to provide a way to both precisely align and ensure stability on the nanometer scale of two of these multilayer Laue lenses to achieve two-dimensional hard X-ray focusing in nanometer scale.

A principal aspect of the present invention is to provide an enhanced multidimensional alignment apparatus for multidimensional aligning of two linear multilayer Laue lenses (MLLs) for two-dimensional hard X-ray focusing.

Other important aspects of the present invention are to provide such enhanced multidimensional alignment apparatus substantially without negative effect and that overcome some of the disadvantages of prior art arrangements.

SUMMARY OF THE INVENTION

In brief, a multidimensional alignment apparatus is provided for multidimensional aligning of two linear multilayer Laue lenses (MLLs) for two-dimensional hard X-ray focusing. The multidimensional alignment apparatus precisely aligns and ensures stability of two linear MLLs performing hard x-ray focusing.

The multidimensional alignment apparatus includes a base, a lower stages group controlling a first upstream MLL, an upper stages group positioned over the lower stages group controlling a second downstream MLL and an upper stage support attached to the base. The lower stages group provides five degrees of freedom precision positioning adjustment for the first upstream MLL. The second downstream MLL is mounted on the upper stages group with three degrees of freedom adjustment capability.

In accordance with features of the invention, the multidimensional alignment apparatus enables substantially ideal two-dimensional (2-D) focusing in nanometer scale, with the two linear multilayer Laue lenses (MLLs) aligned with each other precisely with a total of eight degrees of freedom.

In accordance with features of the invention, the lower stages group includes a commercial motorized horizontal linear stage and a nested flexural bearing structure. The nested flexural bearing structure is operated by a pair of motorized linear stages and a pair of piezoelectric transducer (PZT) or PZT-driven linear stages.

In accordance with features of the invention, the nested flexural bearing structure includes a U-shaped base frame carrying the pair of motorized linear stages, and the pair of PZT-driven linear stages. The nested flexural bearing structure includes a pair of outer flexural bearing structures, and a second, interior U-shaped frame c supporting a four-bar flexural bearing structure. The first upstream MLL is mounted on the PZT-driven linear stage disposed above the four-bar flexural bearing structure. The linear stages are mounted on the U-shaped base frame and cooperating with the outer flexural bearing structures provide a linear positioning in a Y direction and a tilting adjustment around the X-axis for the second U-shaped frame. The second, interior U-shaped frame is the base for a four-bar flexural bearing structure nested in the outer flexural structure. The four-bar flexural bearing structure is operated by one PZT-driven linear stage to provide a precise angular positioning around the Z-axis. The PZT-driven linear stage mounted on the top of the four-bar flexural bearing structure aligns the first upstream MLL in the X direction.

In accordance with features of the invention, the motorized horizontal linear stage includes, for example, an ultrasonic piezomotor with linear optical encoder, for example, having a travel range of 25 mm and a resolution of 0.1 micron. The motorized linear stages of the nested flexural bearing structure include, for example, a DC motor with gearhead and shaft optical encoder having a travel range of, for example, 5 mm and a resolution of 0.1 micron. The PZT-driven linear stage includes, for example, an ultrasonic piezomotor with a linear optical encoder having a travel range of, for example, 5 mm and a resolution of 0.1 micron, for example, to create an angular travel range of 3 degrees and a resolution of 0.4 arcsec. The PZT-driven linear stage includes, for example, an ultrasonic piezomotor with a linear optical encoder having a travel range of, for example, 15 mm and a resolution of 0.1 micron.

In accordance with features of the invention, the upper stage group includes a pair of linear stages driving a carriage through a set of flexural bearings to perform linear positioning in a Z-axis direction with tilting adjustment around the Y-axis, and a third linear stage providing the alignment in an X direction for the second downstream MLL. The upper stage group includes three PZT-driven linear stages, such as ultrasonic piezomotors. The upper stage group includes, for example, an ultrasonic piezomotor with linear optical encoder having a travel range of, for example, 15 mm and a resolution of 0.1 micron. The pair of linear stages driving a carriage through a set of flexural bearings of the upper stage group combines differentially together to create an angular travel range of, for example, 3 degrees and a resolution of 0.4 arcsec.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, a multidimensional alignment apparatus is provided to enable a two-dimensional hard x-ray focusing with two linear multilayer Laue lenses (MLLs). Alternative aspects and uses of the multidimensional alignment apparatus of the invention include, for example, x-ray microscopes using synchrotron radiation sources or other x-ray sources. With scale-up or scale-down adjustment, the multidimensional alignment apparatus may also be used for various other x-ray optics or scientific instruments, such as alignment apparatus for multilayer multi-mirror x-ray focusing optics or multi-zoneplate x-ray focusing optics.

In accordance with features of the invention, the multidimensional alignment apparatus provides high precision resolution and position stability enabling two-dimensional hard x-ray focusing in nanometer scale. The multidimensional alignment apparatus enables substantially ideal two-dimensional (2-D) focusing with the two linear multilayer Laue lenses (MLLs) aligned with each other precisely with a total of eight degrees of freedom.

In accordance with features of the invention, the multidimensional alignment apparatus is provided by a new mechanical design having novel features of compactness and positioning stability enabled by its unique nested structure.

In accordance with features of the invention, the multidimensional alignment apparatus align the two linear multilayer Laue lenses (MLLs) to focus the hard x-rays to a point, providing a spot focus rather than a line focus.

Figure 1:
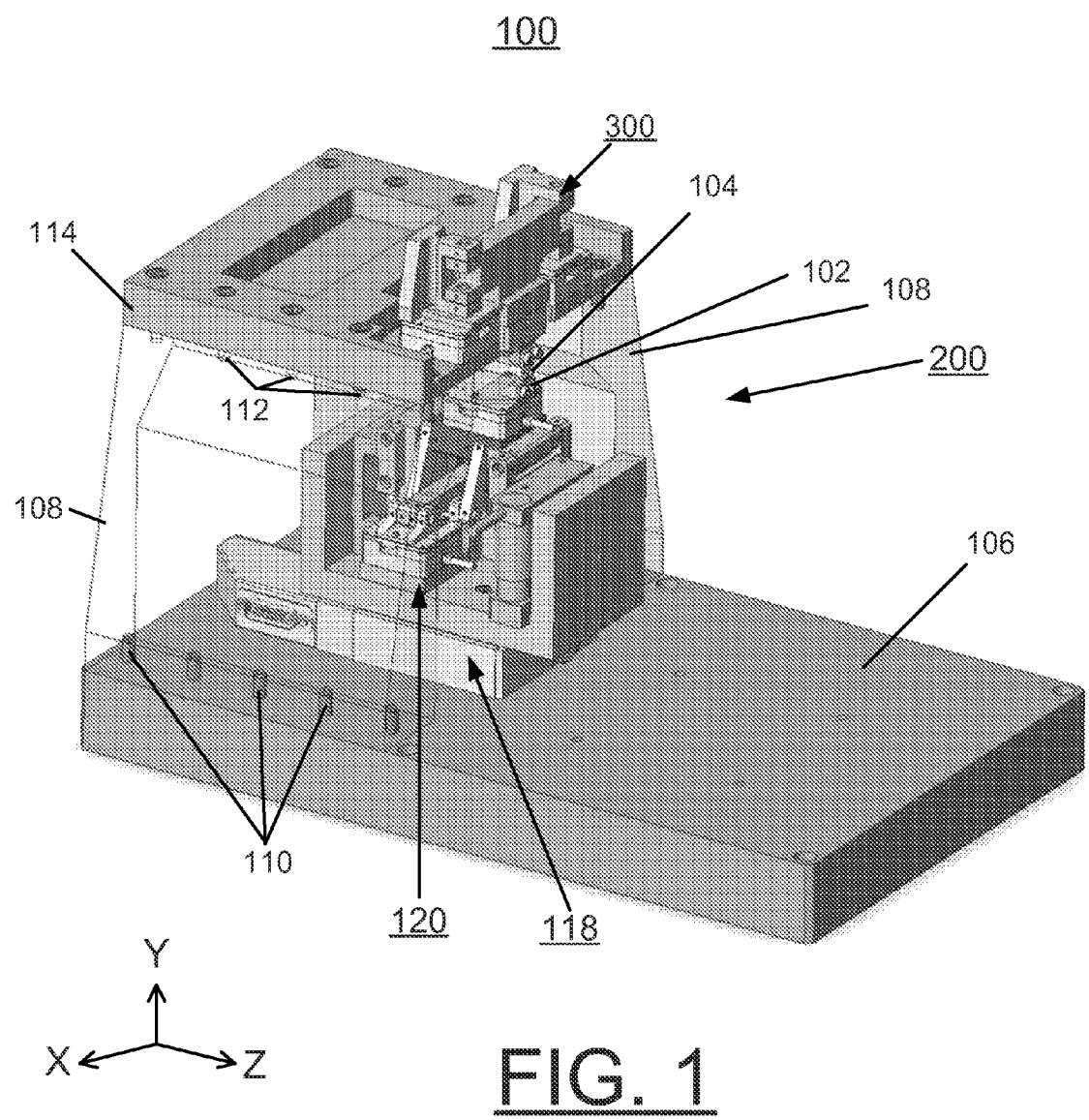
FIG. 1 illustrates an exemplary multidimensional alignment apparatus for multidimensional aligning of two linear multilayer Laue lenses (MLLs) for two-dimensional hard X-ray focusing in accordance with the preferred embodiment.
Figure 2:
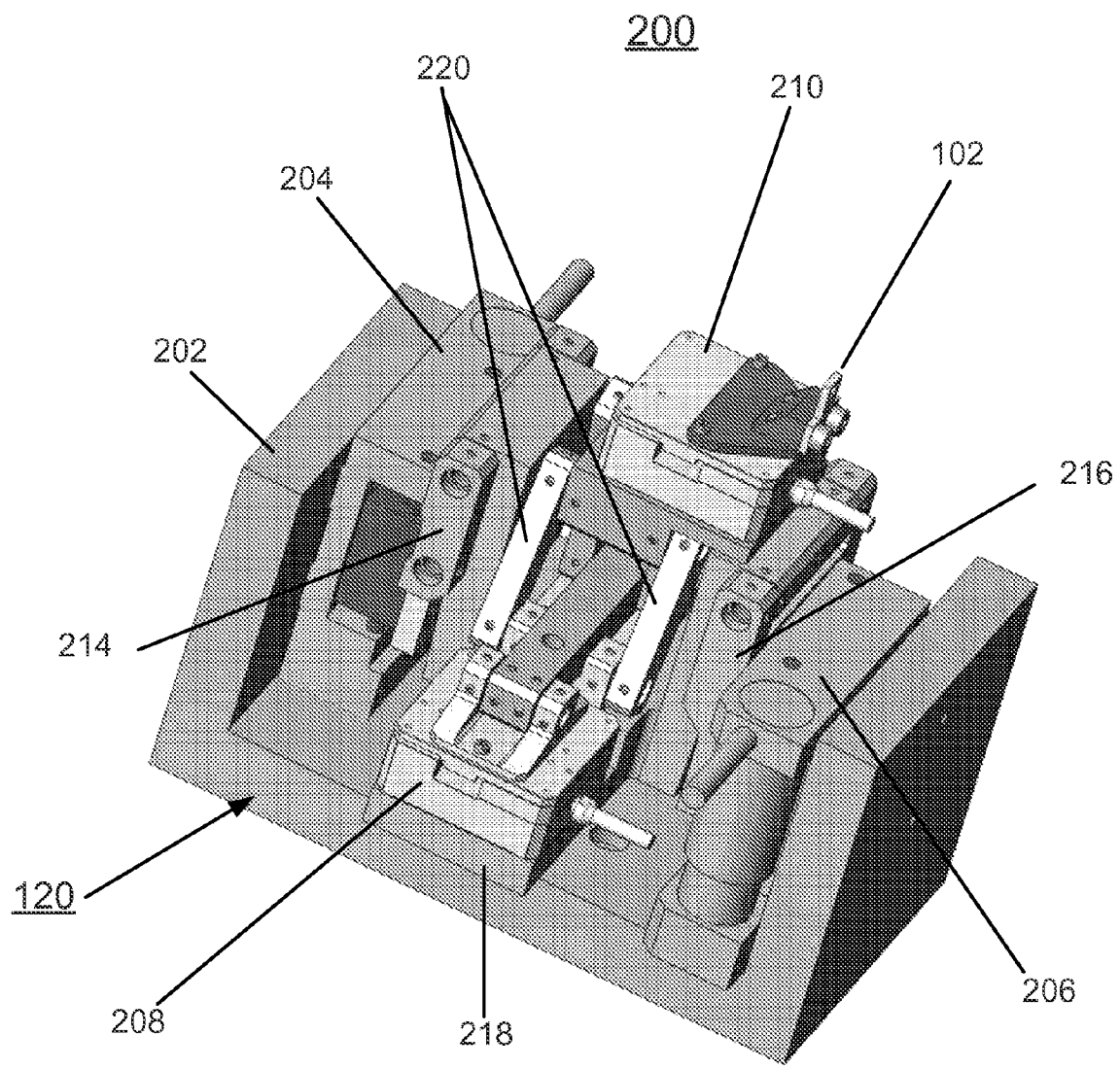
FIG. 2 illustrates an exemplary lower stage controlling a first upstream MLL of the multidimensional alignment apparatus of FIG. 1 in accordance with the preferred embodiment.
Figure 3:
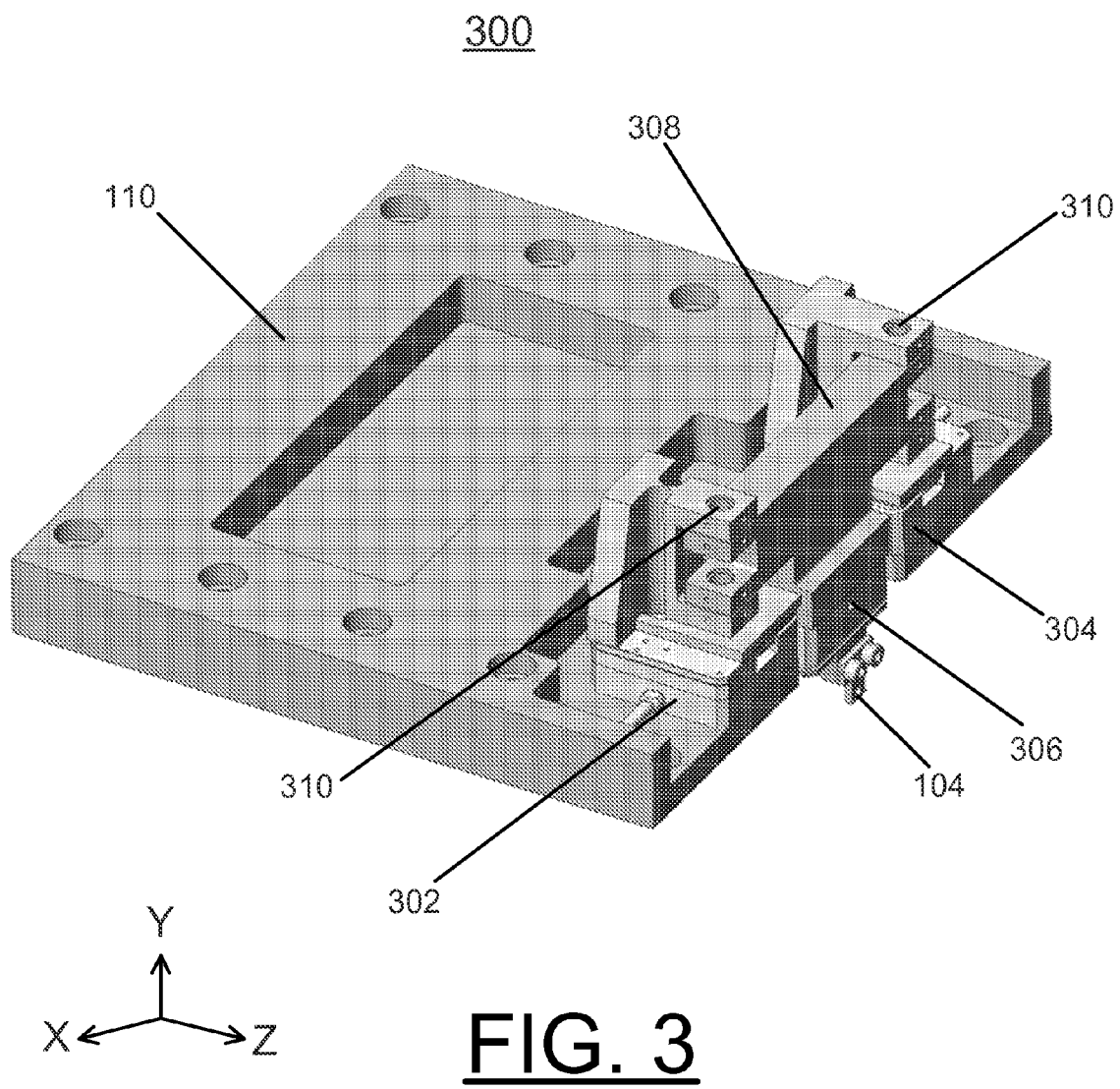
FIG. 3 illustrates an exemplary upper stage positioned over the lower stage controlling a second downstream MLL of the multidimensional alignment apparatus in accordance with the preferred embodiment.

Having reference now to the drawings, FIGS. 1-3 illustrate the multidimensional alignment apparatus in accordance with the preferred embodiment and generally designated by the reference numeral 100.

FIG. 1 shows a three-dimensional model of the multidimensional alignment apparatus 100 of the preferred embodiment of the invention. A pair of linear multilayer Laue lenses (MLLs) 102, 104 is precisely aligned for performing the hard x-ray focusing with the multidimensional alignment apparatus 100.

The multidimensional alignment apparatus 100 includes a lower stages group generally designated by the reference numeral 200 supporting and precisely positioning the first upstream MLL 102. The multidimensional alignment apparatus 100 includes an upper stages group generally designated by the reference numeral 300 supporting and precisely positioning the second downstream MLL 104.

The multidimensional alignment apparatus 100 includes a base plate 106 mounting a pair of support members 108 for supporting the upper stages group 300. The support members 108 include respective cooperating mounting features 110, 112 for cooperatively engaging the base plate 106 and a support base member 114 of the upper stages group 300.

The base plate 106 of the multidimensional alignment apparatus 100 enables positioning resolution and stability for active vibration control in nanometer scale. The base plate 106 advantageously is implemented, for example, with a granite base effectively supporting and positioning the first stages group 200 and including cooperating features, such as mounting features 110 providing effective positioning resolution and stability for the second stages group 300.

The lower stages group 200 includes a motorized horizontal linear stage 118, and a nested flexural bearing structure 120. The lower stages group 200 provides five degrees of freedom precision positioning adjustment for the upstream MLL 102.

The first motorized horizontal linear stage 118 is implemented, for example, with DC servomotor with linear optical encoder having a travel range of 25 mm and a resolution of 0.1 micron, positioning the upstream MLL 102 in the Z direction.

The downstream MLL 104 is mounted on the upper stages group 300 with three degrees of freedom adjustment capability. To perform an ideal 2-D focusing, the upstream MLL 102 and the downstream MLL 104 need to be aligned with each other precisely with a total of eight degrees of freedom, which is provided by the downstream MLL 104.

Referring to FIG. 2, there is shown a three-dimensional model of the nested flexural bearing structure 120 of the lower stages group 200. The nested flexural bearing structure 120 includes a U-shaped base frame 202 carrying a pair of motorized linear stages 204, 206, and a pair of PZT-driven linear stages 208, 210. The nested flexural bearing structure 120 includes a pair of outer flexural bearing structures 214, 216, and a second, interior U-shaped frame 218 supporting a four-bar flexural bearing structure 220. The upstream MLL 102 is supported by the PZT-driven linear stage 210, as shown.

The nested flexural bearing structure 120 is operated by the two commercial motorized linear stages 204, 206, and the two commercial PZT-driven linear stages 208, 210 as shown in FIG. 2.

The linear stages 204, 206 are mounted on the U-shaped base frame 202. Cooperating with the outer flexural bearing structures 214, 216, the linear stages 204, 206 provide a linear positioning in Y direction and a tilting adjustment around the X-axis for the second U-shaped frame 218. The second U-shaped frame 218 is the base for a four-bar flexural bearing structure 220 nested in the outer flexural structure 120. The four-bar flexural bearing structure 120 is operated by the PZT-driven linear stage 208 to provide a precise angular positioning around the Z-axis. The linear stage 210, mounted on the top of the four-bar flexural bearing structure 220, aligns the upstream MLL 102 in X direction.

The linear stages 204, 206 are implemented, for example, with a DC motor with gearhead and shaft optical encoder having a travel range of 5 mm and a resolution of 0.1 micron. The PZT-driven linear stage 208 is implemented, for example, with an ultrasonic piezomotor with a linear optical encoder having a travel range of 5 mm and a resolution of 0.1 micron creating an angular travel range of 3 degrees and a resolution of 0.4 arcsec. The linear stage 210 is implemented, for example, with an ultrasonic piezomotor with a linear optical encoder having a travel range of 15 mm and a resolution of 0.1 micron.

Referring to FIG. 3, there is shown a three-dimensional model of the upper stages group 300. The upper stages group 300 includes three commercial PZT-driven linear stages 302, 304, 306.

As shown in FIG. 3, a pair of linear stages 302, 304 drives a carriage 308 through a set of flexural bearings 310 to perform linear positioning in Z-axis direction with tilting adjustment around the Y-axis. The linear stage 306 provides the alignment in X direction for the downstream MLL 104.

Each of the linear stage 302, 304, 306 is implemented, for example, with an ultrasonic piezomotor with linear optical encoder having a travel range of 15 mm and a resolution of 0.1 micron. The linear stages 304, 206 combine differentially together to create a travel range of 3 degrees and a resolution of 0.4 arcsec.

While the present invention has been described with reference to the details of the embodiments of the invention shown in the drawing, these details are not intended to limit the scope of the invention as claimed in the appended claims.

What is claimed is:

1. A multidimensional alignment apparatus for multidimensional aligning of two linear multilayer Laue lenses (MLLs) for two-dimensional hard X-ray focusing comprising:
    a base,
    a lower stages group controlling a first upstream MLL,
    an upper stages group positioned over said lower stages group controlling a second downstream MLL; and
    an upper stage support attached to the base and supporting said an upper stages group over said lower stages group; and
    said lower stages group providing five degrees of freedom precision positioning adjustment for the first upstream MLL, and said second downstream MLL providing three degrees of freedom adjustment capability to precisely align and ensure stability of the two linear MLLs performing hard x-ray focusing.

2. The multidimensional alignment apparatus for multidimensional aligning of two linear multilayer Laue lenses (MLLs) as recited in claim 1 wherein said base includes a granite base.

3. The multidimensional alignment apparatus for multidimensional aligning of two linear multilayer Laue lenses (MLLs) as recited in claim 1 wherein said base includes cooperating mounting features with said upper stage support for supporting and positioning said upper stages group.

4. The multidimensional alignment apparatus for multidimensional aligning of two linear multilayer Laue lenses (MLLs) as recited in claim 1 enables substantially ideal two-dimensional (2-D) focusing in nanometer scale, with the two linear multilayer Laue lenses (MLLs) aligned with each other.

5. The multidimensional alignment apparatus for multidimensional aligning of two linear multilayer Laue lenses (MLLs) as recited in claim 1 wherein said lower stages group includes a first motorized horizontal linear stage and a nested flexural bearing structure.

6. The multidimensional alignment apparatus for multidimensional aligning of two linear multilayer Laue lenses (MLLs) as recited in claim 5 wherein said nested flexural bearing structure is operated by a pair of motorized linear stages and a pair of piezoelectric transducer (PZT)-driven linear stages.

7. The multidimensional alignment apparatus for multidimensional aligning of two linear multilayer Laue lenses (MLLs) as recited in claim 1 wherein lower stages group includes a nested flexural bearing structure, said nested flexural bearing structure includes a U-shaped base frame carrying a first motorized linear stage and a second motorized linear stage, and a first piezoelectric transducer (PZT)-driven linear stages and a second PZT-driven linear stage.

8. The multidimensional alignment apparatus for multidimensional aligning of two linear multilayer Laue lenses (MLLs) as recited in claim 7 wherein said nested flexural bearing structure includes a pair of outer flexural bearing structures, and a second, interior U-shaped frame supporting a four-bar flexural bearing structure.

9. The multidimensional alignment apparatus for multidimensional aligning of two linear multilayer Laue lenses (MLLs) as recited in claim 8 wherein said first upstream MLL is mounted on said second PZT-driven linear stage disposed above the four-bar flexural bearing structure.

10. The multidimensional alignment apparatus for multidimensional aligning of two linear multilayer Laue lenses (MLLs) as recited in claim 8 wherein said first motorized linear stage and said second motorized linear stage are mounted on said first U-shaped base frame, cooperating with said outer flexural bearing structures to provide a linear positioning in a Y direction and a tilting adjustment around an X-axis for the second U-shaped frame.

11. The multidimensional alignment apparatus for multidimensional aligning of two linear multilayer Laue lenses (MLLs) as recited in claim 8 wherein said four-bar flexural bearing structure is operated by said first PZT-driven linear stage to provide a precise angular positioning around the Z-axis.

12. The multidimensional alignment apparatus for multidimensional aligning of two linear multilayer Laue lenses (MLLs) as recited in claim 8 wherein said second PZT-driven linear stage mounted on the top of the four-bar flexural bearing structure aligns the first upstream MLL in X direction.

13. The multidimensional alignment apparatus for multidimensional aligning of two linear multilayer Laue lenses (MLLs) as recited in claim 1 wherein said upper stage group includes a pair of linear stages driving a carriage through a set of flexural bearings to perform linear positioning in a Z-axis direction with tilting adjustment around a Y-axis.

14. The multidimensional alignment apparatus for multidimensional aligning of two linear multilayer Laue lenses (MLLs) as recited in claim 13 wherein said upper stage group includes a third linear stage providing the alignment in an X direction for the second downstream MLL.

15. The multidimensional alignment apparatus for multidimensional aligning of two linear multilayer Laue lenses (MLLs) as recited in claim 1 wherein said upper stage group includes three piezoelectric transducer (PZT)-driven linear stages.

16. The multidimensional alignment apparatus for multidimensional aligning of two linear multilayer Laue lenses (MLLs) as recited in claim 1 wherein said upper stage group includes three ultrasonic piezomotors with linear optical encoders.

17. The multidimensional alignment apparatus for multidimensional aligning of two linear multilayer Laue lenses (MLLs) as recited in claim 1 wherein said lower stages group includes a motorized horizontal linear stage and a nested flexural bearing structure, said motorized horizontal linear stage includes a DC servomotor with linear optical encoder.

18. The multidimensional alignment apparatus for multidimensional aligning of two linear multilayer Laue lenses (MLLs) as recited in claim 17 wherein said nested flexural bearing structure is operated by a pair of motorized linear stages and a pair of piezoelectric transducer (PZT)-driven linear stages.

19. The multidimensional alignment apparatus for multidimensional aligning of two linear multilayer Laue lenses (MLLs) as recited in claim 1 wherein said motorized linear stages include a DC motor with gearhead and shaft optical encoder, and said PZT-driven linear stages include an ultrasonic piezomotor with a linear optical encoder.

20. A multidimensional alignment apparatus for multidimensional aligning of two linear multilayer Laue lenses (MLLs) for two-dimensional hard X-ray focusing comprising:
  a base,
  a lower stages group controlling a first upstream MLL and providing five degrees of freedom precision positioning adjustment for said first upstream MLL, said lower stages group including a first motorized horizontal linear stage and a nested flexural bearing structure;
  said first motorized horizontal linear stage positioning said first upstream MLL in a Z direction;
  said nested flexural bearing structure including a first motorized linear stage and a second motorized linear stage cooperating with a pair of outer flexural bearing structures to provide a linear positioning in a Y direction and a tilting adjustment around an X-axis for a second U-shaped frame, and a first piezoelectric transducer (PZT)-driven linear stage and a second PZT-driven linear stage, and an interior flexural bearing structure being operated by said first PZT-driven linear stage to provide a precise angular positioning around the Z-axis and said second PZT-driven linear stage mounted on said interior flexural bearing structure aligning said first upstream MLL in X direction;
  an upper stages group positioned over said lower stages group controlling a second downstream MLL and providing three degrees of freedom adjustment capability to precisely align and ensure stability of the two linear MLLs performing hard x-ray focusing; said upper stage group including a carriage and a set of flexural bearings;
  said upper stage group including a pair of linear stages driving a carriage through a set of flexural bearings to perform linear positioning in the Z-axis direction with tilting adjustment around the Y-axis.

* * * * *